(12) United States Patent
DiMartino, Sr.

(10) Patent No.: US 6,796,369 B1
(45) Date of Patent: Sep. 28, 2004

(54) METHOD AND APPARATUS TO PREVENT METAL DUSTING

(75) Inventor: Stephen Paul DiMartino, Sr., Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/406,992

(22) Filed: Apr. 4, 2003

(51) Int. Cl.[7] .................................................. F16F 1/34
(52) U.S. Cl. ..................... 165/71; 422/197; 422/202; 422/204; 252/372; 252/377
(58) Field of Search ..................... 165/71, 95, 134.1, 165/157; 252/372–377; 422/197, 202, 204

(56) References Cited

U.S. PATENT DOCUMENTS

| | | | | |
|---|---|---|---|---|
| 3,958,951 A | * | 5/1976 | Woebcke et al. | ........... 422/201 |
| 4,648,999 A | * | 3/1987 | Armstrong et al. | ........... 261/77 |
| 4,919,844 A | | 4/1990 | Wang | ........... 252/373 |
| 5,167,933 A | * | 12/1992 | Norsk | ........... 422/148 |
| 5,935,517 A | | 8/1999 | Roll et al. | ........... 422/9 |
| 6,362,367 B2 | * | 3/2002 | Braithwaite et al. | ........... 562/531 |
| 6,432,369 B1 | * | 8/2002 | Mulvaney et al. | ........... 422/213 |
| 2003/0101651 A1 | * | 6/2003 | Weedon | ........... 48/197 R |

* cited by examiner

Primary Examiner—Terrell McKinnon
(74) Attorney, Agent, or Firm—Keith D. Gourley

(57) ABSTRACT

An apparatus and a method for inhibiting metal dusting corrosion of a tubesheet inside a shell-and-tube heat exchanger having at least one exit nozzle for transmitting at least one process fluid from the shell-and-tube heat exchanger include and use: an isolation baffle disposed inside the shell-and-tube heat exchanger at a location between a first exit nozzle and the tubesheet, whereby an isolated space exists between the tubesheet and the isolation baffle; and a means for purging the isolated space with a purging fluid.

24 Claims, 3 Drawing Sheets

METHOD AND APPARATUS TO PREVENT METAL DUSTING

BACKGROUND OF THE INVENTION

The present invention relates to the prevention of metal dusting corrosion, and in particular to preventing or inhibiting metal dusting corrosion of a tubesheet inside a shell-and-tube heat exchanger, such as a gas heated reformer.

The invention is discussed herein with respect to gas heated reformers. However, persons skilled in the art will recognize that the invention may be applied to any shell-and-tube heat exchanger wherein a shellside gas may cause metal dusting to occur on the back of a tubesheet.

Syngas (a mixture of hydrogen and carbon monoxide) is produced by steam reforming and/or partial oxidation of natural gas or other hydrocarbons. Syngas processes are being developed which teach the use of hot reformed gas as a heat source to provide heat for the endothermic reforming of more feedstock. Such processes often use a "gas heated reformer," a shell-and-tube heat exchanger type device comprising tubes containing catalyst used for the reforming and a shell in which hot gases from a second reforming step provide the thermal energy required for the endothermic reaction.

There are two basic types of gas heated reformers. The first is a classical shell-and-tube heat exchanger in which the heating and cooling streams do not mix. The second is a "2 in 1 out" type of reformer in which the reacting stream mixes with the heating stream within the unit.

The selection of materials of construction for gas heated reformers is a concern because most metals are prone to "metal dusting," a form of localized degradation or corrosion that occurs in environments containing carbon and hydrogen compounds but almost no oxygen. Metal dusting occurs when carbon monoxide gases are cooled such that the equilibrium of the reaction in equation 1 moves to the right hand side:

$$2\ CO \leftrightarrows C + CO_2 \qquad \text{Equation 1}$$

The carbon formed by this reaction diffuses into metal surfaces forming metal carbides. The metal carbide separates from the parent metal and leaves the system. This process is collectively referred to as metal dusting.

At temperatures sufficiently high where the equilibrium of the reaction in equation 1 favors the left side, no carbon can form and thus metal dusting cannot take place. At low temperatures, the kinetics for the reaction in equation 1 are low and the reaction rate is extremely slow so that metal dusting does not occur, or if it does occur, it is at a rate so low as to cause no concern. At intermediate temperatures, generally between about 800° F. and 1,300° F., metal dusting is a concern. Most proposed gas heated reformers will operate within the range of temperatures where metal dusting does occur.

Some commonly used techniques or methods to reduce metal dusting provide dense layers of alloys or other materials on the metal surface which prevent the gas from contacting the base metal. Examples are sulfides or oxides coupled with alumina and silica. However, the temperatures in the process and the thermal expansions and contractions caused by the temperature changes bringing the unit from ambient to operating temperature can produce defects in the surface oxide and sulfide layers. Some alloys, such as Alloy 601 H, provide resistance to metal dusting. Another technique is to use a pack cementation process which produces an aluminum-rich layer on the treated metal.

The pack cementation process is a process that deposits an aluminum rich layer on a metallic surface. The metal piece(s) is (are) placed in a retort and covered with an aluminum containing powder. The powder also contains a halide which is used to move the aluminum (as an aluminum halide) to the base metal surface where it alloys with the base metal forming a metal aluminide. The process needs high temperatures to mobilize the aluminum, so it takes place in a furnace at temperatures or about 170–2000° F. depending on the base metal and the amount of aluminum to be deposited. One company that can apply such an aluminum rich coating is Alon Surface Technologies Inc.

Air Products and Chemicals, Inc. has developed a gas heated reformer in which the tubes are protected using such a pack cementation process. The shell walls are protected by refractory, but the back of the tubesheet has no metal dusting corrosion protection. This is due to the metallurgy of the tubesheet and the potential for thermal distortion of the tubesheet during the pack cementation process and the difficulty of attaching tubes to the tubesheet afterwards. Once the tubes have been attached to the tubesheet, the assembly is too large to be so protected. The problem is how to prevent the back of the tubesheet in this type of gas heated reformer from undergoing metal dusting attack.

A similar gas heated reformer is taught in U.S. Pat. No. 4,919,844 (Wang), which discloses an enhanced heat transfer reformer (EHTR). Metal dusting was not a concern in the operation of the first EHTR's, since the operating conditions were deliberately chosen such that the temperature of the syngas contacting the back of the tubesheet was not in the range where metal dusting occurs. However, to take advantage of the full potential of the EHTR, later versions and processes in which EHTR units have been incorporated operate at conditions at which the back of the tubesheet are exposed to gas that will result in metal dusting.

In the 2 in 1 out type EHTR, a first stream comprising a mixture of natural gas and steam is fed to the top of the tubesheet, and the mixture then passes through containing tubes. The gas is heated as it passes through the tubes and reacts to form a mixture (syngas) of hydrogen, carbon monoxide, and carbon dioxide according to the steam reforming and water gas shift reactions. The feed mixture may or may not be subjected to an adiabatic pre-reforming step prior to being fed into the EHTR. The feed mixture also may contain any hydrocarbon other than natural gas that is normally reformed to provide syngas.

A second stream of hot reformed gas from a conventional steam methane reformer, autothermal reformer, or other syngas generating device known in the industry. Since it has been reformed, this second stream is somewhat hotter than the first stream. The heat contained in the second stream is used to provide the energy for reforming the first stream. This second stream enters the EHTR at the end of the unit where the first stream is exiting from the tubes; it mixes with the gas exiting the tubes and then passes up the unit on the shellside giving up its heat as it goes. The heat transferred from the shellside to the tubeside of the unit is sufficient for the reaction occurring inside the tubes. Once the shellside gas reaches the top of the unit, it exits the unit for further processing.

As the EHTR has been incorporated into additional processes, the need for greater efficiency has resulted in modified operating conditions (e.g., temperatures and pressures) such that the exiting gas is within the range where metal dusting occurs. Therefore, there is a need to protect the back of the tubesheet from metal dusting. The prior art has not adequately addressed this need.

U.S. Pat. No. 5,935,517 (Röll et al.) discloses a method to protect a refractory lined transfer line from metal dusting. Gas tight chambers are formed within the refractory with a ring, and the chambers are purged with a CO-free gas (e.g., water vapor, $H_2$, $N_2$, $CO_2$ or mixtures thereof) that does not result in metal dusting, the purge gas diffusing through the generally porous refractory.

An article entitled "Mega-ammonia round-up" in *Nitrogen & Methanol*, No. 258, July–August, 2002, which discusses the KBR (Kellogg, Brown & Root) KRES reactor, states on page 45 at column 3, last paragraph, that; "By limiting the mixed feed inlet temperature to 580–610° C. and applying a refractory face to the shell side of the tubesheet . . . in a lower-grade material than the alloy 601 used in previous units . . . " This seems to imply that KBR has chosen to use a material selection (alloy 601 or refractory lining) to avoid metal dusting on the back of the tubesheet for a gas heated reformer of the 2 in 1 out type.

An article entitled "Improve steam reformer performance" in *Hydrocarbon Processing*, March 1996, states in the first paragraph on page 73 that: "Several design strategies can be implemented to prevent MDC [Metal Dusting Corrosion]: Displace syngas by a suitable purge." The article goes on to describe a methodology for utilizing an inert purge along with other design details to mitigate the potential for metal dusting in a collection manifold from a steam methane reformer, as opposed to a gas heated reformer.

It is desired to have an apparatus and method to protect the back of a tubesheet from metal dusting in a shell-and-tube heat exchanger.

It is further desired to have an apparatus and a method to prevent or inhibit metal dusting corrosion of a tubesheet inside a gas heated reformer.

It is still further desired to have an apparatus for heat exchanging at least one process fluid in which a tubesheet in the apparatus is protected from metal dusting.

It is still further desired to have a method for assembling a heat exchanger for heat exchanging at least one process fluid which includes a means for preventing or inhibiting metal dusting corrosion of a tubesheet in the heat exchanger.

It also is desired to have an apparatus and method for inhibiting metal dusting corrosion of a tubesheet inside a heat exchanger which affords better performance than the prior art, and which overcomes many of the difficulties and disadvantages of the prior art to provide better and more advantageous results.

BRIEF SUMMARY OF THE INVENTION

The present invention is an apparatus and a method for inhibiting metal dusting corrosion of a tubesheet inside a shell-and-tube heat exchanger. The invention also includes a method for assembling a shell-and-tube heat exchanger for heat exchanging at least one process fluid, and a process for heat exchanging at least one process fluid, the process including a method for inhibiting metal dusting corrosion.

With regard to the apparatus, a first embodiment is an apparatus for inhibiting metal dusting corrosion of a tubesheet inside a shell-and-tube heat exchanger having at least one exit nozzle for transmitting at least one process fluid from the shell-and-tube heat exchanger. The apparatus includes: an isolation baffle disposed inside the shell-and-tube heat exchanger at a location between a first exit nozzle and the tubesheet, whereby an isolated space exists between the tubesheet and the isolation baffle; and a means for purging the isolated space with a purging fluid.

There are several variations of the first embodiment. In one variation, the purging fluid is a portion of the process fluid. In another variation, the tubesheet has a substantially circular shape having a first radius from a center of the isolation baffle and the plurality of apertures are in a substantially circular pattern within the tubesheet at a second radius approximately equal to the first radius multiplied by $\sqrt{2}/2$.

In another variation, the tubesheet has a plurality of apertures and at least a portion of the purging fluid passes through the apertures into the isolated space. In a variant of that variation, the first exit nozzle is at a first location and a second exit nozzle is at a location opposite the first location, and at least a majority of the apertures are aligned in the tubesheet in a substantially straight line substantially perpendicular to another straight line extending from the first location to the second location.

In yet another variation, the means for purging the isolated space also includes an inlet nozzle in fluid communication with the isolated space. In a variant of this variation, at least a portion of the purging fluid is steam. In another variant, the apparatus also includes a means for passing at least a portion of the purging fluid through the isolation baffle, whereby the purging fluid mixes with at least a portion of the process fluid.

A second embodiment is similar to the first embodiment but also includes a means for passing at least a portion of the purging fluid through the isolation baffle, whereby the purging fluid mixes with at least a portion of the process fluid.

A third embodiment is an apparatus for inhibiting metal dusting corrosion of a tubesheet inside a shell-and-tube gas heated reformer having a shell adapted to contain a shellside process fluid in at least one tube adapted to contain a tubeside process fluid, the shell-and-tube gas heated reformer having at least one exit nozzle for transmitting at least a portion of the shellside process fluid from the shell-and-tube gas heated reformer. This apparatus includes: an isolation baffle disposed inside the shell-and-tube gas heated reformer at a location between the exit nozzle and the tubesheet, whereby an isolated space exists between the tubesheet and the isolation baffle; a means for purging the isolated space with a purging fluid, wherein the purging fluid is a portion of the tubeside process fluid, and wherein the tubesheet has a plurality of apertures and at least a portion of the purging fluid passes through the apertures into the isolated space; and a means for passing at least a portion of the purging fluid through the isolation baffle, whereby the purging fluid mixes with at least a portion of the shellside process fluid.

A fourth embodiment is an apparatus for heat exchanging at least one process fluid, which includes: an elongated shell enclosing an interior region; a tubesheet disposed in the interior region; at least one exit nozzle adapted to transmit at least a portion of the process fluid from the interior region to an exterior location; an isolation baffle disposed inside the interior region at an interior location between the exit nozzle and the tubesheet, whereby an isolated space exists in the interior region between the tubesheet and the isolation baffle; and a means for purging the isolated space with a purging fluid.

A fifth embodiment is similar to the fourth embodiment but also includes a means for passing at least a portion of the purging fluid through the isolation baffle, whereby the purging fluid mixes with at least a portion of the process fluid.

With regard to the method, a first embodiment is a method for inhibiting metal dusting corrosion of a tubesheet inside a shell-and-tube heat exchanger having at least one exit nozzle for transmitting at least one process fluid from the shell-and-tube heat exchanger. The method includes multiple steps. The first step is to provide an isolation baffle inside the shell-and-tube heat exchanger at a location between a first exit nozzle and the tubesheet, whereby an isolated space is created between the tubesheet and the isolation baffle. The second step is to purge the isolated space with a purging fluid.

There are several variations of the first embodiment of the method. In one variation, the purging fluid is a portion of the process fluid. In another variation, the tubesheet has a substantially circular shape having a first radius from a center of the tubesheet and the plurality of apertures are in a substantially circular pattern within the isolation baffle at a second radius approximately equal to the first radius multiplied by $\sqrt{2}/2$.

In another variation, the tubesheet has a plurality of apertures and at least a portion of the purging fluid passes through the apertures into the isolated space. In a variant of this variation, the first exit nozzle is at a first location and a second exit nozzle is at a second location opposite the first location, and at least a majority of the apertures are aligned in the tubesheet in a substantially straight line substantially perpendicular to another straight line extending from the first location to the second location.

A second embodiment of the method is similar to the first embodiment but includes an additional step of passing at least a portion of the purging fluid through the isolation baffle, thereby mixing the purging fluid with at least a portion of the process fluid.

A third embodiment of the method is similar to the first embodiment but includes two additional steps. The first additional step is to provide an inlet nozzle in fluid communication with the isolated space. The second additional step is to feed a stream of the purging fluid to the isolated space from the inlet nozzle. In a variation of this embodiment, at least a portion of the purging fluid is steam.

A fourth embodiment is a method for inhibiting metal dusting corrosion of a tubesheet inside a shell-and-tube gas heated reformer having a shell adapted to contain a shellside process fluid in at least one tube adapted to contain a tubeside process fluid, the shell-and-tube gas heated reformer having at least one exit nozzle for transmitting at least a portion of the shellside process fluid from the shell-and-tube gas heated reformer. This embodiment includes multiple steps. The first step is to provide an isolation baffle inside the shell-and-tube gas heated reformer at a location between the exit nozzle and the tubesheet, whereby an isolated space is created between the tubesheet and the isolation baffle. The second step is to purge the isolated space with a purging fluid, wherein the purging fluid is a portion of the tubeside process fluid, and wherein the tubesheet has a plurality of apertures and at least a portion of the purging fluid passes through the apertures into the isolated space. The third step is to pass at least a portion of the purging fluid through the isolation baffle, thereby mixing the purging fluid with at least a portion of a shellside process fluid.

Another aspect of the invention is a process for heat exchanging at least one process fluid, the process including a method for inhibiting metal dusting corrosion as in any of the above embodiments of the method or variations thereof.

The invention also includes a method for assembling a shell-and-tube heat exchanger for heat exchanging at least one process fluid. The method for assembling includes multiple steps. The first step is to provide an elongated shell enclosing an interior region. The second step is to install a tubesheet in the interior region. The third step is to provide at least one exit nozzle adapted to transmit at least a portion of the process fluid from the interior region to an exterior location. The fourth step is to install an isolation baffle inside the interior region at an interior location between the exit nozzle and the tubesheet, whereby an isolated space is provided in the interior region between the tubesheet and the isolation baffle. The fifth step is to provide a means for purging the isolated space with a purging fluid.

A second embodiment of the method for assembling is similar to the first embodiment but includes the additional step of providing a means for passing at least a portion of the purging fluid through the isolation baffle, whereby the purging fluid mixes with at least a portion of the process fluid.

BRIEF DESCRIPTION OF THE DRAWINGS

The invention will be described by way of example with reference to the accompanying drawings, in which.

DETAILED DESCRIPTION OF THE INVENTION

The present invention includes an apparatus and method to protect the tubesheet of a shell-and-tube heat exchanger, such as a gas heated reformer or enhanced heat transfer reformer (EHTR), from metal dusting. This includes partially isolating the tubesheet from the process gas by means of an isolation baffle and sweeping the volume between the tubesheet and the isolation baffle with a gas that will not promote metal dusting, thereby protecting the back of the tubesheet.

The present invention provides a means and arrangement to keep the hot process gas on the shell side of the unit from contacting the backside of the tubesheet by providing a zone (isolated space) to be swept with a purge gas that inhibits metal dusting, introducing said purge gas into the zone, and allowing that purge gas to mix with the balance of the syngas leaving the unit for further processing.

Figure 1:
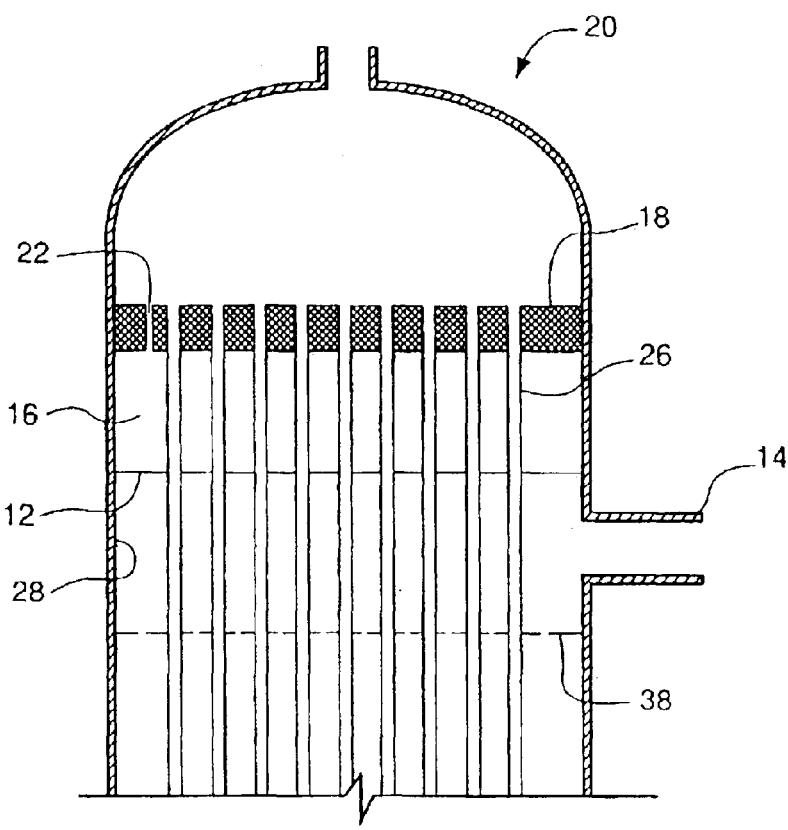
FIG. 1 is a schematic diagram illustrating a side view of a gas heated reformer incorporating one embodiment of the present invention.
Figure 2:
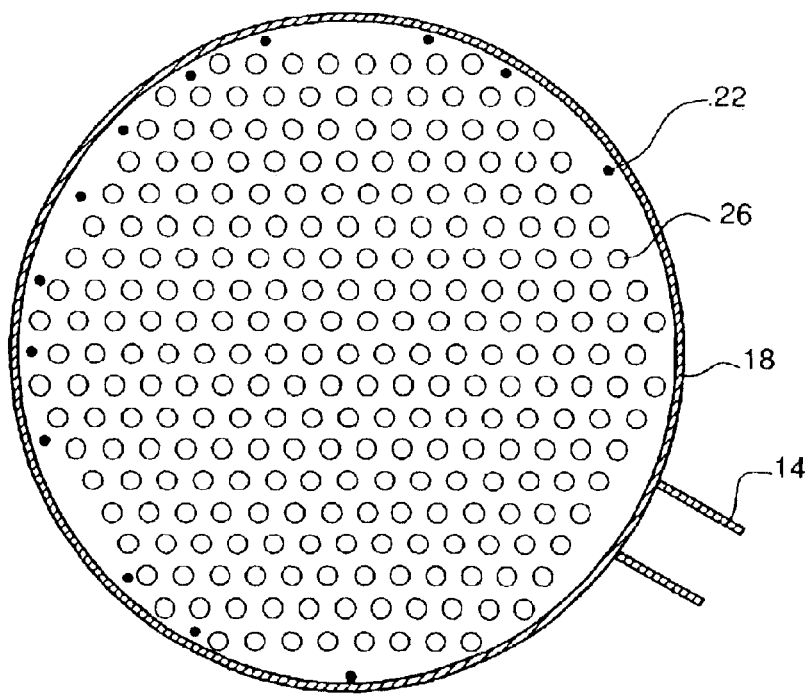
FIG. 2 is a schematic diagram illustrating the top view of a tubesheet with edge purge ports used in the embodiment shown in FIG. 1.

FIG. 1 illustrates a side view of a gas heated reformer such as an EHTR 20 incorporating one embodiment of the present invention. In this embodiment, the purge ports 22 are near the edge of the tubesheet 18, as shown in FIGS. 1 and 2. Some other key features of the invention are discussed below.

A gas distribution baffle 38 is provided below the exit nozzle 14 to ensure even flow of gas over all the tubes as the gas travels vertically up the shell side of the EHTR 20.

Without this baffle, the gas would tend to short circuit to the exit bypassing those tubes located opposite the shell from the exit nozzle.

An isolation baffle 12 is located above the exit nozzle 14 separating the flow path of the combined synthesis gas (syngas) from a protected or isolated space 16 between the isolation baffle and the tubesheet 18.

The purge ports 22 in the tubesheet 18 allow a small portion of feed gas to leak through the tubesheet and purge the isolated space 16 between the tubesheet and the isolation baffle 12. The flow through the purge ports is carefully calibrated to provide a minimum velocity in the annuli (not shown) between the tubes 26 and the isolation baffle 12, and the annulus (not shown) between the isolation baffle 12 and the inner wall 28 of the EHTR 20. The location and spacing of the purge ports is chosen to provide one of several flow patterns in the isolated space between the tubesheet and the isolation baffle. The selection depends on the relative clearances (the annuli) between the tubes and the isolation baffle, and between the isolation baffle and the inner wall of the EHTR. In the embodiment shown in FIGS. 1 and 2, the flow is generally across the tube bundle toward the exit nozzle 14 from the inner wall of the EHTR diametrically opposite the exit nozzle.

FIG. 2 illustrates the tubesheet 18 with the catalyst containing tubes 26 and the purge ports 22 in the tubesheet. The flow from the purge ports is designed to sweep the entire volume of the isolated space 16 between the isolation baffle 12 and the tubesheet 18, as shown in FIG. 1.

Figure 3:
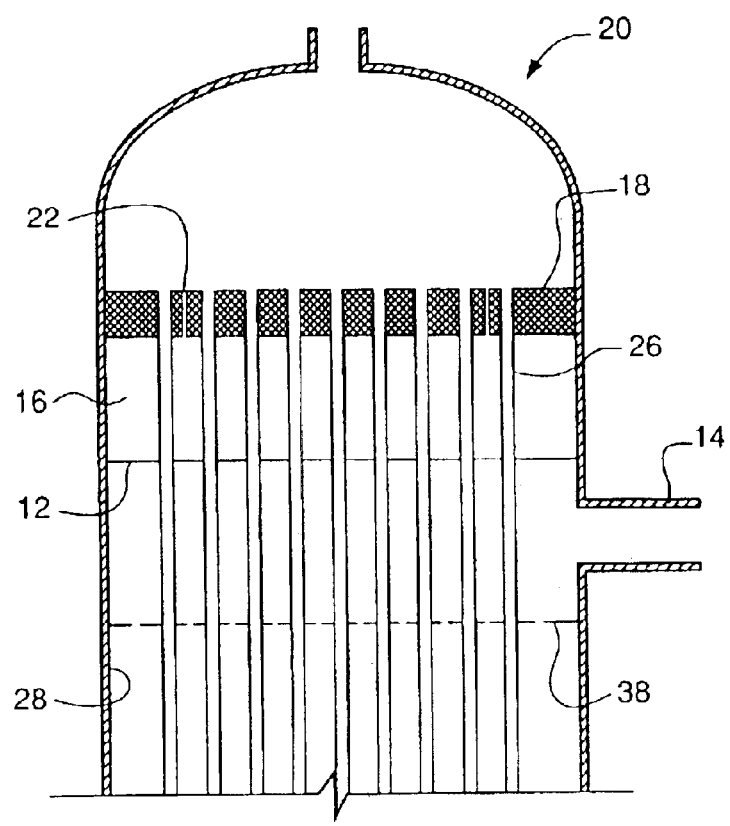
FIG. 3 is a schematic diagram illustrating a side view of a gas heated reformer incorporating another embodiment of the present invention.
Figure 4:
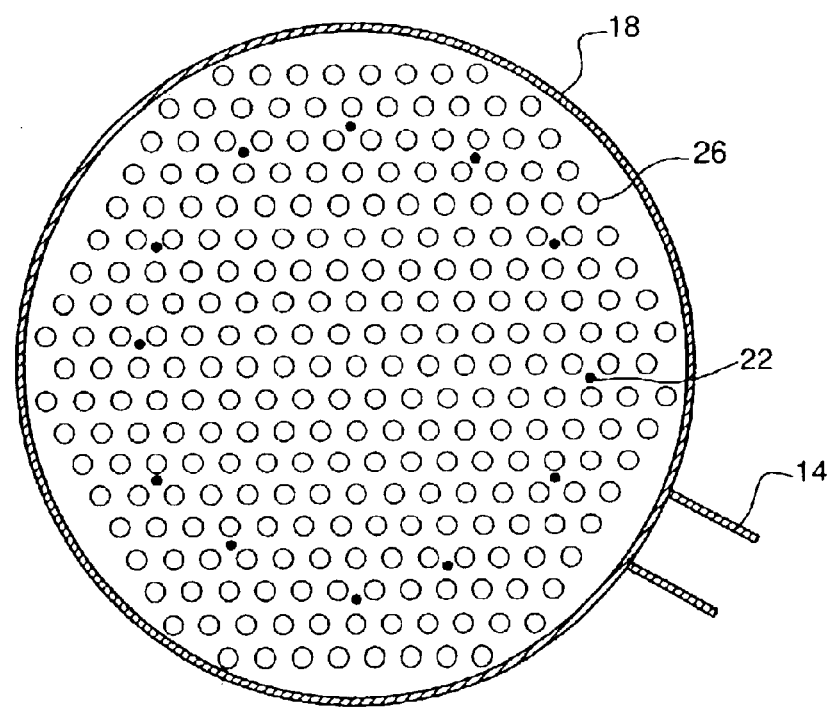
FIG. 4 is a schematic diagram illustrating a top view of a tubesheet having central purge ports used in the embodiment illustrated in FIG. 3.

FIGS. 3 and 4 illustrate another embodiment of the invention with the purge ports 22 located more centrally in the tubesheet 18. In this embodiment, the purge ports are located on a circle with radius $$R_{Hole\ Circle} = R_{Tubesheet} * \sqrt{2}/2 \qquad \text{Equation 2}$$

so that there is an equal area inside and outside the "hole circle." In this embodiment the flow from the purge ports is from the purge ports outward and inward in the area between the isolation baffle 12 and the tubesheet 18. In this case, since the purge gas flow does not have as far to travel, there is a greater probability that the flow will be more uniform through the annuli between the tubes 26 and the isolation baffle 12, and the annulus between the isolation baffle 12 and the inner wall 28 of the EHTR 20.

Figure 5:
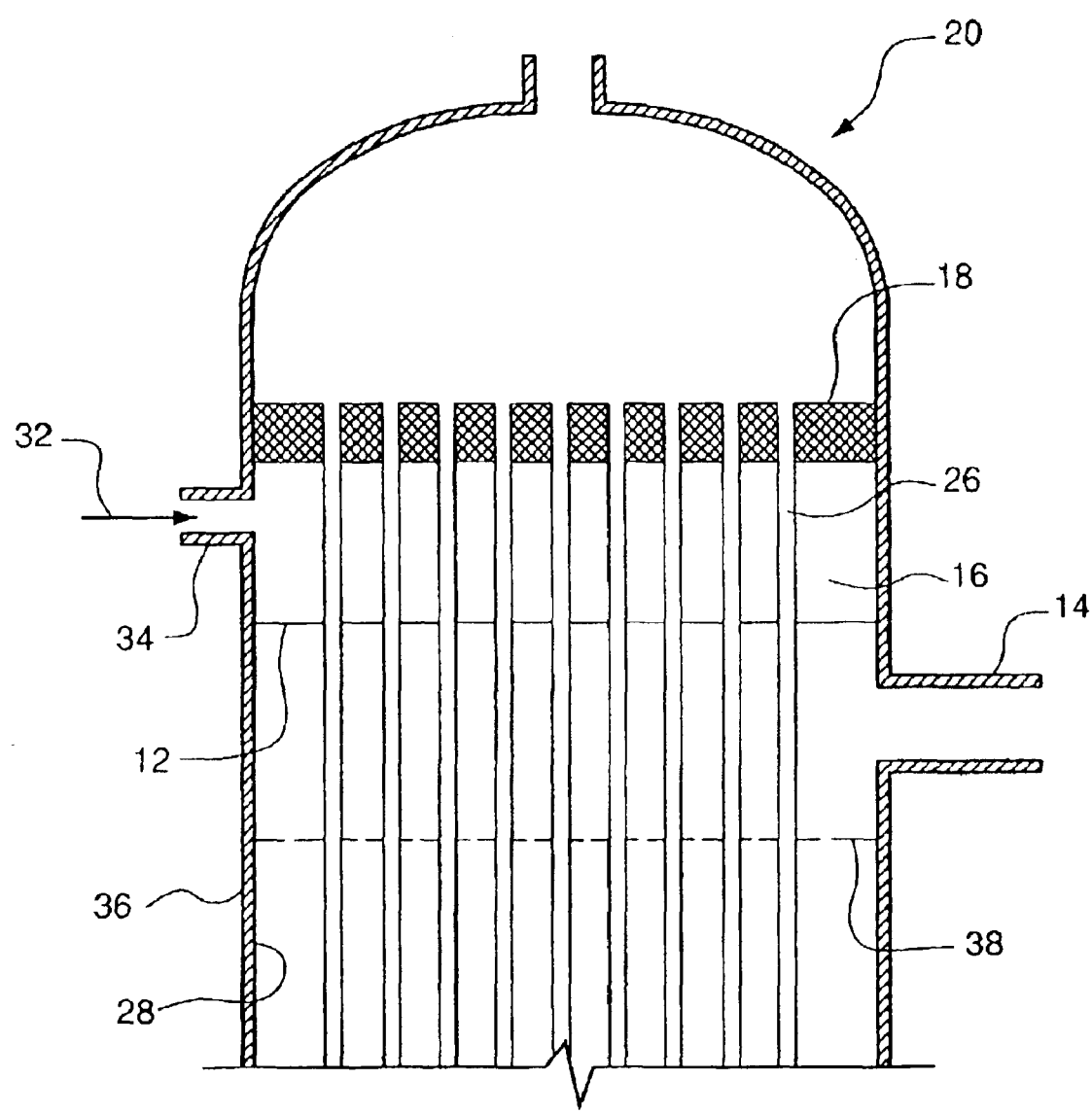
FIG. 5 is a schematic diagram illustrating a side view of a gas heated reformer having an inlet nozzle for use in purging in yet another embodiment of the invention.

While the embodiments shown in FIGS. 1–4 use a portion of the process fluid as the purge gas or sweep gas, there may be situations where that is not desirable. For example, since the purge gas will not be reformed, the concentration of higher hydrocarbons may be unacceptable for downstream processing, or the methane in the feed may increase the overall methane concentration to an unacceptable level. In these cases, a purge gas other than the feed gas may be desired. For example, a stream 32 of steam may be used for purging, as shown in FIG. 5. Steam will adequately purge the isolated space 16 between the isolation baffle 12 and the tubesheet 18; and since it introduces no impurities into the process stream, the steam can be added at higher levels than feed gas, if needed.

While an internal manifold (not shown) could be constructed within the feed enclosure of the EHTR 20, it is simpler to add the steam through a single external nozzle (inlet nozzle) 34 in the sidewall 36 of the EHTR. In this case, since the steam (purge gas) will be introduced at a single point rather than in a distributed manner, slightly more steam may be needed to adequately ensure that the steam is properly distributed across all of the annul between the isolation baffle 12 and the tubes 26, and the annulus between the isolation baffle 12 and the inner wall 28 of the EHTR.

Other hole patterns through the tubesheet 18 can be used if it is desired to direct the purge gas in a particular manner. For example, the EHTR 20 may have two exit nozzles 14 rather than one. If the exit nozzles are arranged 180° apart, the most preferred manner to arrange the purge ports 22 is on the diameter perpendicular to the diameter between the two exit nozzles. Other patterns may be preferred for different orientations of the exit nozzles to ensure adequate purging of the isolated space 16.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for inhibiting metal dusting corrosion of a tubesheet inside a shell-and-tube heat exchanger having at least one exit nozzle for transmitting at least one process fluid from the shell-and-tube heat exchanger, comprising:

an isolation baffle disposed inside the shell-and-tube heat exchanger at a location between a first exit nozzle and the tubesheet, whereby an isolated space exists between the tubesheet and the isolation baffle; and means for purging the isolated space with a purging fluid.

2. An apparatus as in claim 1, further comprising:

means for passing at least a portion of the purging fluid through the isolation baffle, whereby the purging fluid mixes with at least a portion of the process fluid.

3. An apparatus as in claim 1, wherein the purging fluid is a portion of the process fluid.

4. An apparatus as in claim 1, wherein the tubesheet has a plurality of apertures and at least a portion of the purging fluid passes through the apertures into the isolated space.

5. An apparatus as in claim 4, wherein the tubesheet has a substantially circular shape having a first radius from a center of the isolation baffle and the plurality of apertures are in a substantially circular pattern within the tubesheet at a second radius approximately equal to the first radius multiplied by √2/2.

6. An apparatus as in claim 4, wherein the first exit nozzle is at a first location and a second exit nozzle is at a second location opposite the first location, and wherein at least a majority of the apertures are aligned in the tubesheet in a substantially straight line substantially perpendicular to another straight line extending from the first location to the second location.

7. An apparatus as in claim 1, wherein the means for purging the isolated space further comprises an inlet nozzle in fluid communication with the isolated space.

8. An apparatus as in claim 7, further comprising:

means for passing at least a portion of the purging fluid through the isolation baffle, whereby the purging fluid mixes with at least a portion of the process fluid.

9. An apparatus as in claim 7, wherein at least a portion of the purging fluid is steam.

10. An apparatus for inhibiting metal dusting corrosion of a tubesheet inside a shell-and-tube gas heated reformer having a shell adapted to contain a shellside process fluid and at least one tube adapted to contain a tubeside process fluid, the shell-and-tube gas heated reformer having at least one exit nozzle for transmitting at least a portion of the shellside process fluid from the shell-and-tube gas heated reformer, comprising:

an isolation baffle disposed inside the shell-and-tube gas heated reformer at a location between the exit nozzle and the tubesheet, whereby an isolated space exists between the tubesheet and the isolation baffle;

means for purging the isolated space with a purging fluid, wherein the purging fluid is a portion of the tubeside process fluid, and wherein the tubesheet has a plurality of apertures and at least a portion of the purging fluid passes through the apertures into the isolated space; and means for passing at least a portion of the purging fluid through the isolation baffle, whereby the purging fluid mixes with at least a portion of the shellside process fluid.

11. An apparatus for heat exchanging at least one process fluid, comprising:

an elongated shell enclosing an interior region;

a tubesheet disposed in the interior region;

at least one exit nozzle adapted to transmit at least a portion of the process fluid from the interior region to an exterior location;

an isolation baffle disposed inside the interior region at an interior location between the exit nozzle and the tubesheet, whereby an isolated space exists in the interior region between the tubesheet and the isolation baffle; and means for purging the isolated space with a purging fluid.

12. An apparatus as in claim 11, further comprising:

means for passing at least a portion of the purging fluid through the isolation baffle, whereby the purging fluid mixes with at least a portion of the process fluid.

13. A method for inhibiting metal dusting corrosion of a tubesheet inside a shell-and-tube heat exchanger having at least one exit nozzle for transmitting at least one process fluid from the shell-and-tube heat exchanger, comprising the steps of:

providing an isolation baffle inside the shell-and-tube heat exchanger at a location between a first exit nozzle and the tubesheet, whereby an isolated space is created between the tubesheet and the isolation baffle; and purging the isolated space with a purging fluid.

14. A method as in claim 13, comprising the further step of:

passing at least a portion of the purging fluid through the isolation baffle, thereby mixing the purging fluid with at least a portion of the process fluid.

15. A method as in claim 13, wherein the purging fluid is a portion of the process fluid.

16. A method as in claim 13, wherein the tubesheet has a plurality of apertures and at least a portion of the purging fluid passes through the apertures into the isolated space.

17. A method as in claim 13, wherein the tubesheet has a substantially circular shape having a first radius from a center of the tubesheet and the plurality of apertures are in a substantially circular pattern within the isolation baffle at a second radius approximately equal to the first radius multiplied by $\sqrt{2}/2$.

18. A method as in claim 16, wherein the first exit nozzle is at a first location and a second exit nozzle is at a second location opposite the first location, and wherein at least a majority of the apertures are aligned in the tubesheet in a substantially straight line substantially perpendicular to another straight line extending from the first location to the second location.

19. A method as in claim 13, comprising the further steps of:

providing an inlet nozzle in fluid communication with the isolated space; and feeding a stream of the purging fluid to the isolated space from the inlet nozzle.

20. A method as in claim 19, wherein at least a portion of the purging fluid is steam.

21. A method for inhibiting metal dusting corrosion of a tubesheet inside a shell-and-tube gas heated reformer having a shell adapted to contain a shellside process fluid and at least one tube adapted to contain a tubeside process fluid, the shell-and-tube gas heated reformer having at least one exit nozzle for transmitting at least a portion of the shellside process fluid from the shell-and-tube gas heated reformer, comprising the steps of:

providing an isolation baffle inside the shell-and-tube gas heated reformer at a location between the exit nozzle and the tubesheet, whereby an isolated space is created between the tubesheet and the isolation baffle;

purging the isolated space with a purging fluid, wherein the purging fluid is a portion of the tubeside process fluid, and wherein the tubesheet has a plurality of apertures and at least a portion of the purging fluid passes through the apertures into the isolated space; and passing at least a portion of the purging fluid through the isolation baffle, thereby mixing the purging fluid with at least a portion of the shellside process fluid.

22. A process for heat exchanging at least one process fluid, the process including a method for inhibiting metal dusting corrosion as in claim 13.

23. A method for assembling a shell-and-tube heat exchanger for heat exchanging at least one process fluid, comprising the steps of:

providing an elongated shell enclosing an interior region;

installing a tubesheet in the interior region;

providing at least one exit nozzle adapted to transmit at least a portion of the process fluid from the interior region to an exterior location;

installing an isolation baffle inside the interior region at an interior location between the exit nozzle and the tubesheet, whereby an isolated space is provided in the interior region between the tubesheet and the isolation baffle; and providing a means for purging the isolated space with a purging fluid.

24. A method for assembling as in claim 23, further comprising:

providing a means for passing at least a portion of the purging fluid through the isolation baffle, whereby the purging fluid mixes with at least a portion of the process fluid.

* * * * *